Dec. 18, 1928.                1,695,908
T. U. WHITE ET AL
SUPERVISORY CONTROL SYSTEM
Filed April 21, 1924    9 Sheets-Sheet 4

Substation.

WITNESSES:

INVENTORS
Thomas U. White and
John E. Gardner
BY
ATTORNEY

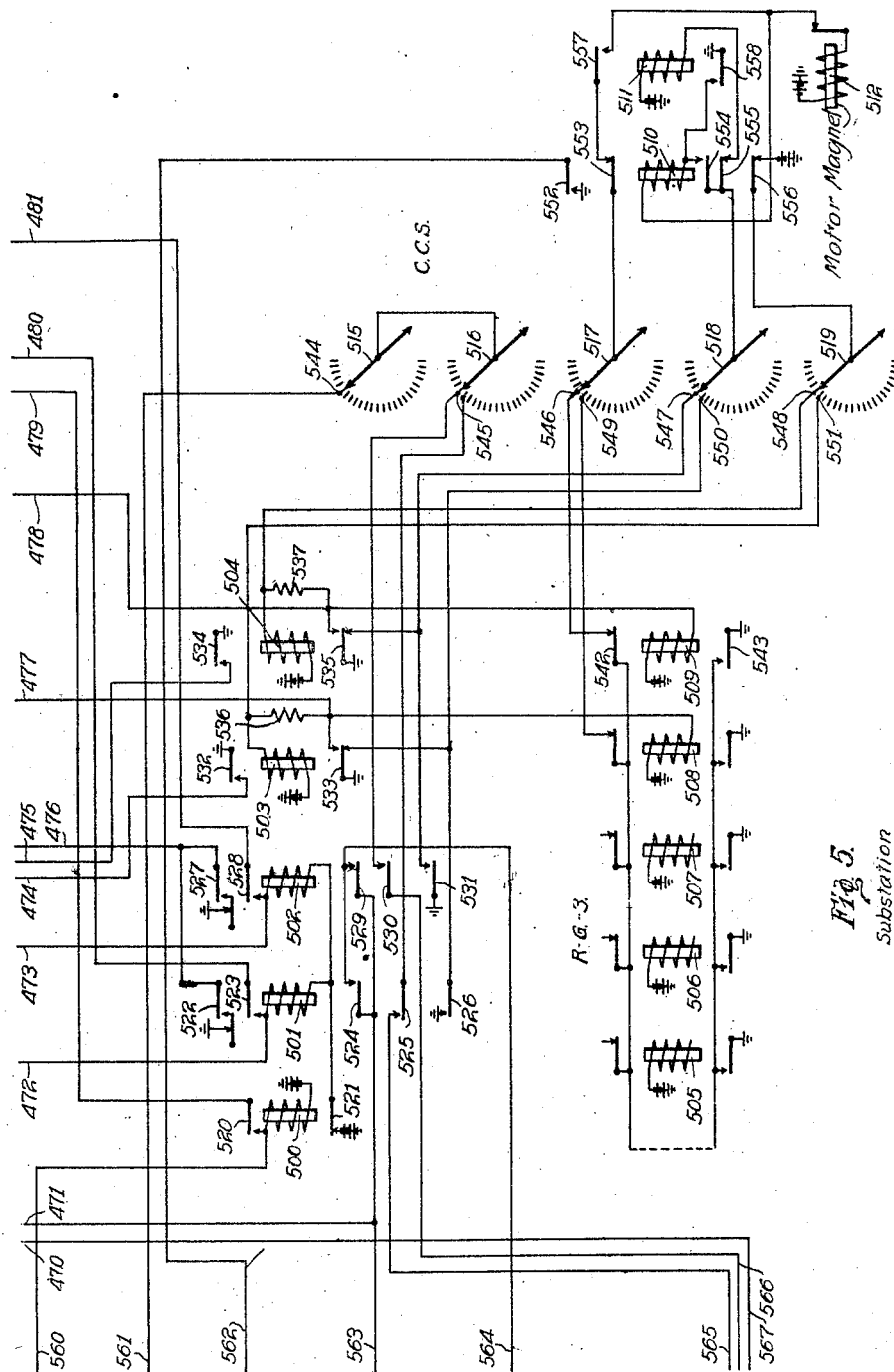

Dec. 18, 1928.
T. U. WHITE ET AL
1,695,908
SUPERVISORY CONTROL SYSTEM
Filed April 21, 1924      9 Sheets-Sheet 6
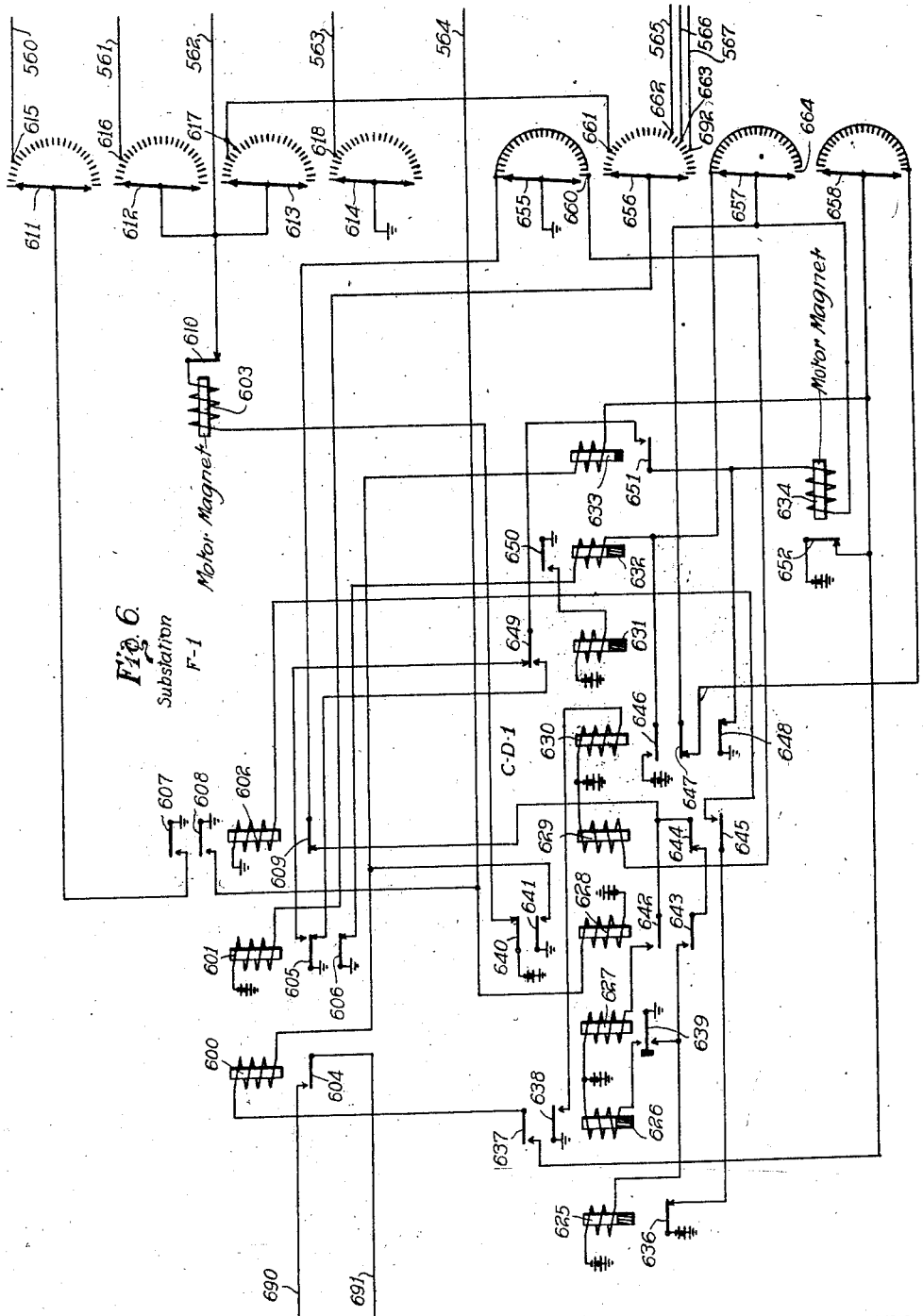
WITNESSES:
INVENTORS
Thomas U. White and
John E. Gardner.
BY
ATTORNEY

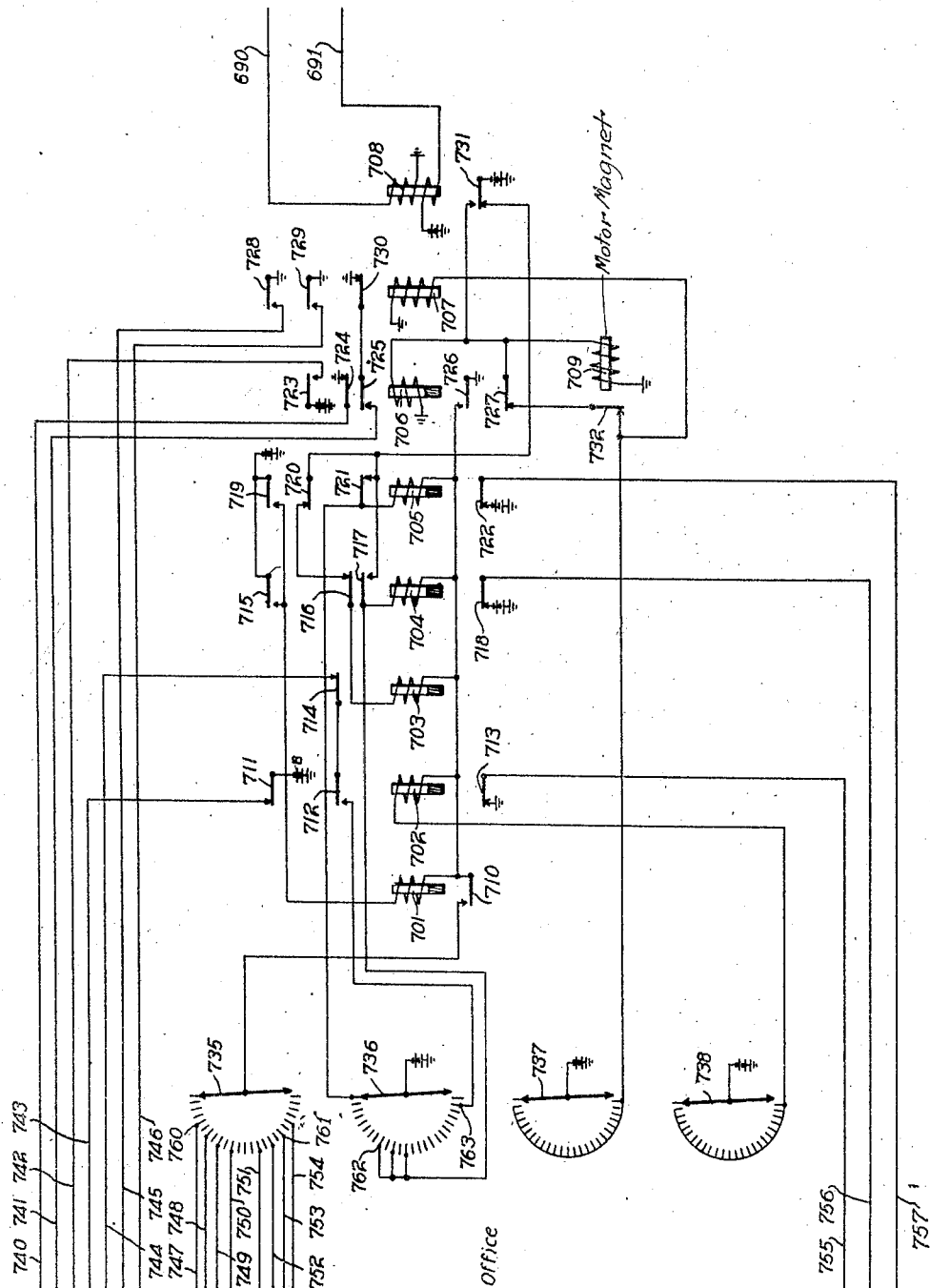

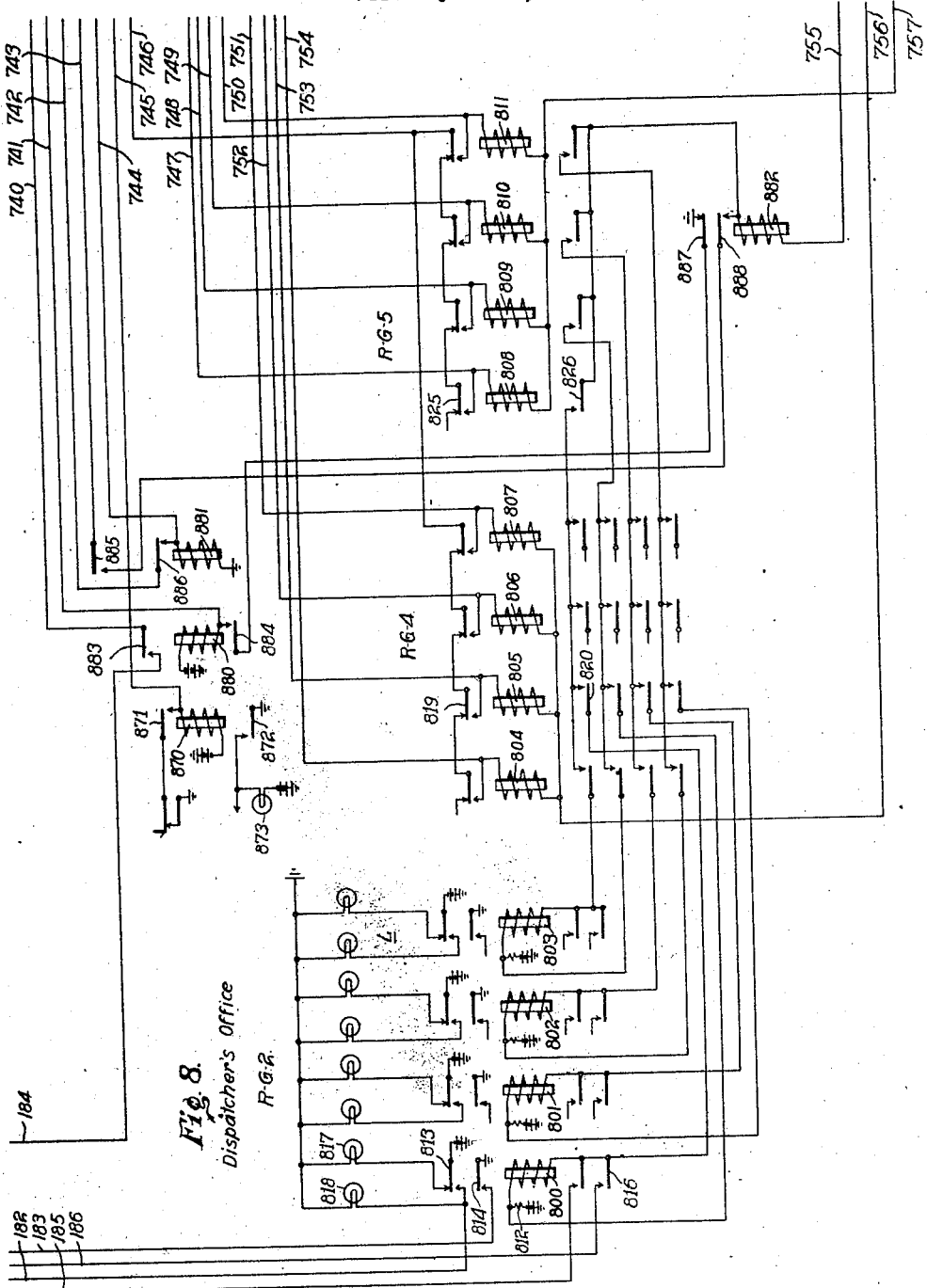

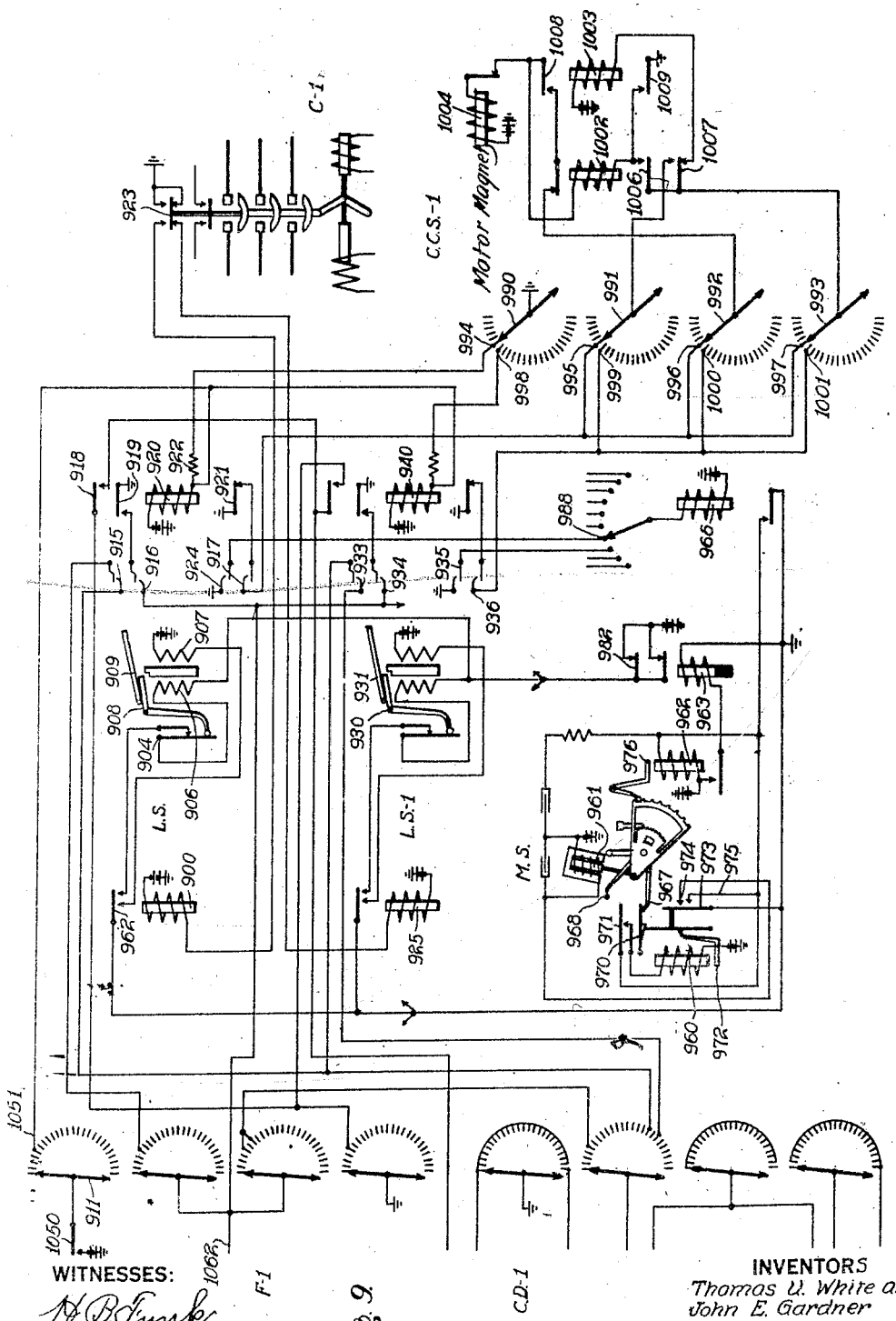

Patented Dec. 18, 1928.

1,695,908

UNITED STATES PATENT OFFICE.

THOMAS U. WHITE, OF PITTSBURGH, AND JOHN E. GARDNER, OF WILKINSBURG, PENNSYLVANIA, ASSIGNORS TO WESTINGHOUSE ELECTRIC & MANUFACTURING COMPANY, A CORPORATION OF PENNSYLVANIA.

SUPERVISORY CONTROL SYSTEM.

Application filed April 21, 1924. Serial No. 707,866.

Our invention relates to supervisory control systems and particularly to systems for supervising and controlling, from a central point, remotely-disposed electrical apparatus.

One of the objects of our invention is to provide means for supervising, at a central point or dispatcher's office, remotely-disposed electrical apparatus arranged so that the operation of the remote apparatus is signalled at the office in the identical sequence as that in which it occurs.

Another object of our invention is to arrange circuits for signalling the operation of apparatus units at a distant point or substation in the sequence that these operations take place, even though the operations occur before the selective apparatus has had time to function.

A still further object of our invention is to provide means for signalling at the central point, all operations of the apparatus units under supervision, whether such action takes place as a result of control from the central point or dispatcher's office or takes place automatically under the control of current-responsive devices at the station.

In practicing our invention, we provide a group of supervisory lamps and controlling keys for each substation to be used for supervising and controlling the apparatus units therein. There is a trunk line connecting the dispatcher's office to each substation. Associated with one end of each trunk line is a directively controlled automatic switch. Also, in each substation, there is an automatic sending equipment associated with the trunk line. In addition, in the dispatcher's office, an automatic impulse-sending device is provided for controlling the operation of the directively controlled switch at the substation and which is operated in response to the operation of the control keys.

Referring now to the drawings, comprising Figures 1 to 9, inclusive, there is shown, by means of conventional diagrams, sufficient of the circuits and apparatus to enable our invention to be readily explained and understood.

Figures 1 to 8, inclusive, when placed side by side with the corresponding lines at the ends thereof in alinement, illustrate the circuits of our complete system.

Figs. 1, 7 and 8 are diagrammatic views of the equipment located in the load dispatcher's office, while Figs. 2 to 6, inclusive, are similar views of the selective and control equipment in an automatic substation of the system.

Fig. 9 illustrates a modification of our invention.

When one of the apparatus units at the station or substation changes its condition, under automatic control, the automatic impulse sender in the substation operates to send a series of impulses over the trunk line in accordance with the apparatus unit operated. Responsive to these series of impulses, the automatic directively controlled switch, associated with the trunk line at the dispatcher's office, is operated to control the operation of the supervisory signals. The operation of these signals serves to apprise the dispatcher of the operation of the apparatus unit.

In order to operate an apparatus unit, the dispatcher operates a key corresponding to the operation of the apparatus unit desired. As a result of this operation, the automatic impulse-sending device in the dispatcher's office is caused to operate. Series of impulses are thus sent over the trunk line to operate the directively controlled switch in the substation. The operation of the switch causes the selection and operation of the desired apparatus unit. The operation of the unit, of course, causes the supervisory signalling devices to be changed in the same manner as if the unit were operated under automatic control.

Means are so provided that, if two or more apparatus units operate at substantially the same time, the automatic sending device at the substation will function to send the supervisory signals reporting such operations to the office in identically the same sequence as that in which the units operate.

Figure 1:
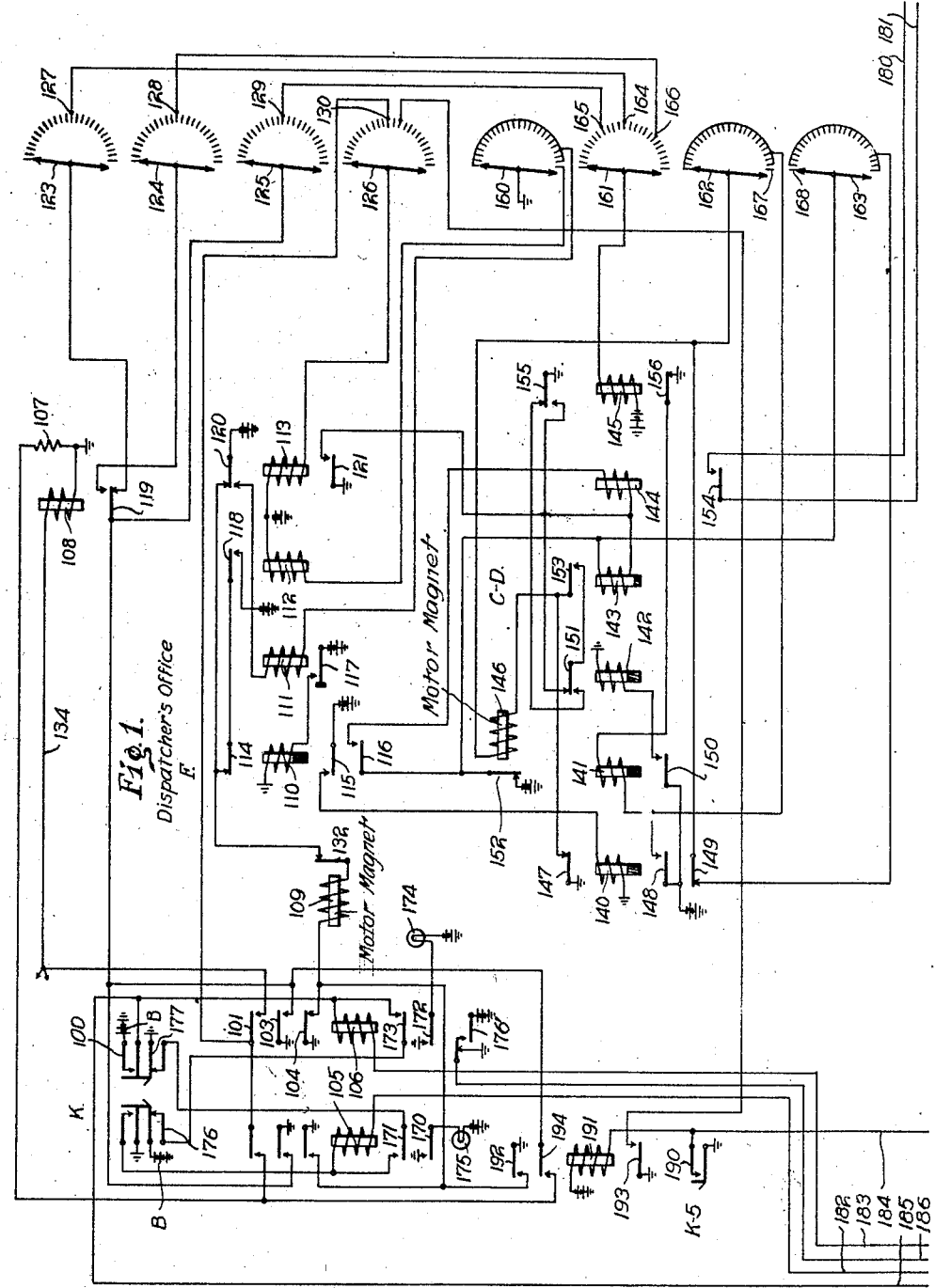

Referring now more particularly to Fig. 1, in the upper left-hand corner thereof is shown a key K. This key is one of several groups of keys and is of the ordinary double-throw type that is automatically returning to normal after being actuated in either direction. A switch F is a finder switch of the usual rotary type, as illustrated in the patent to Clement No. 1,107,153, the wipers of which move in a forward direction only. The finder switch is provided with four wipers 123 to 126, inclusive, each of which is adapted to engage a contact bank comprising twenty-five contact members. The wipers of the finder switch F have no normal position.

The switch CD is a code-sending switch similar in mechanical construction to the finder switch F. On account of differences in circuit design, the switch CD performs different functions than the switch F and is rotated to normal position at the end of each operation.

Figure 2:
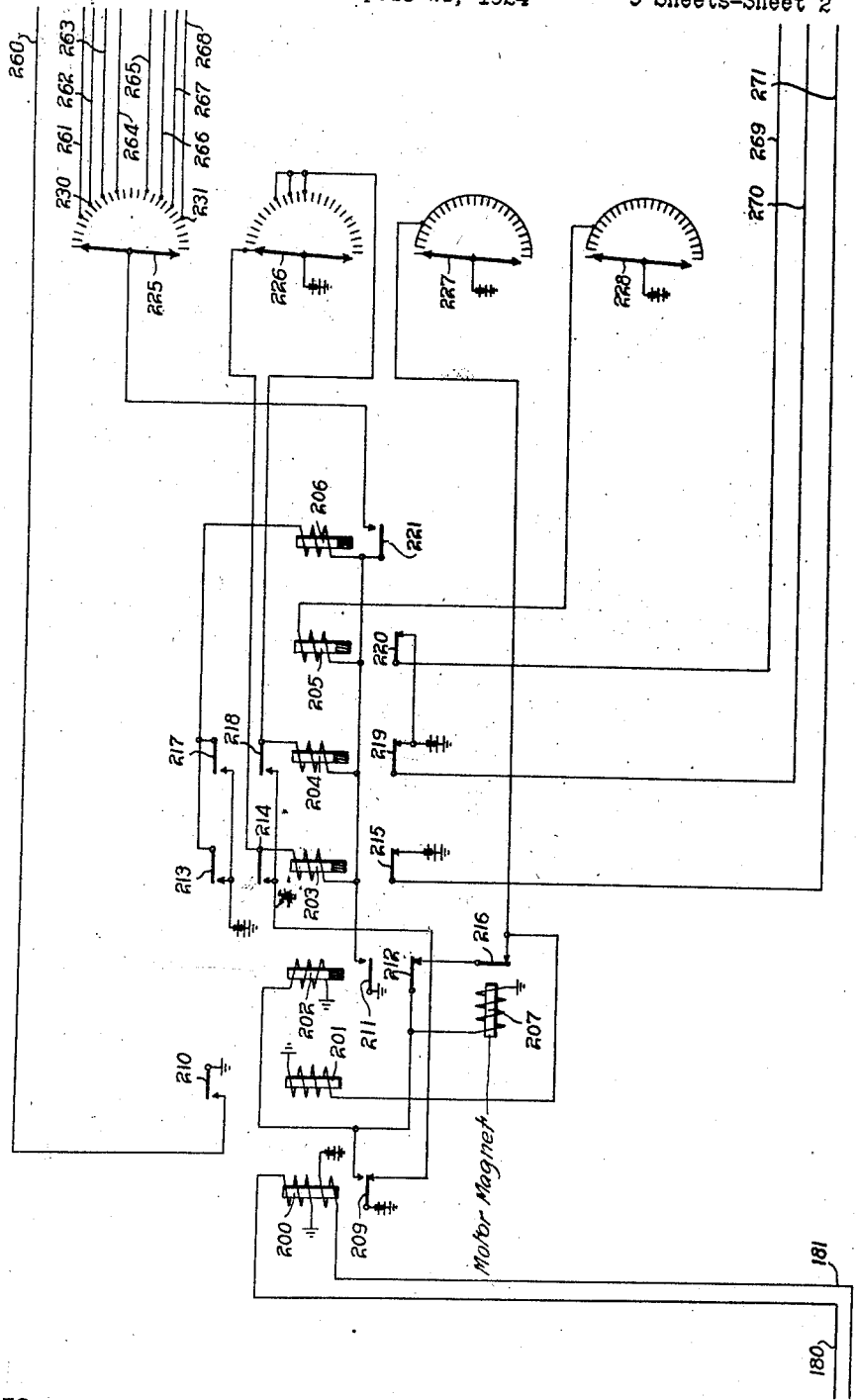

In Fig. 2, there is shown a connector switch H. This switch is of the same general mechanical construction as the switch F. However, its circuits have been so designed as to enable it to be directively operated.

Figure 3:
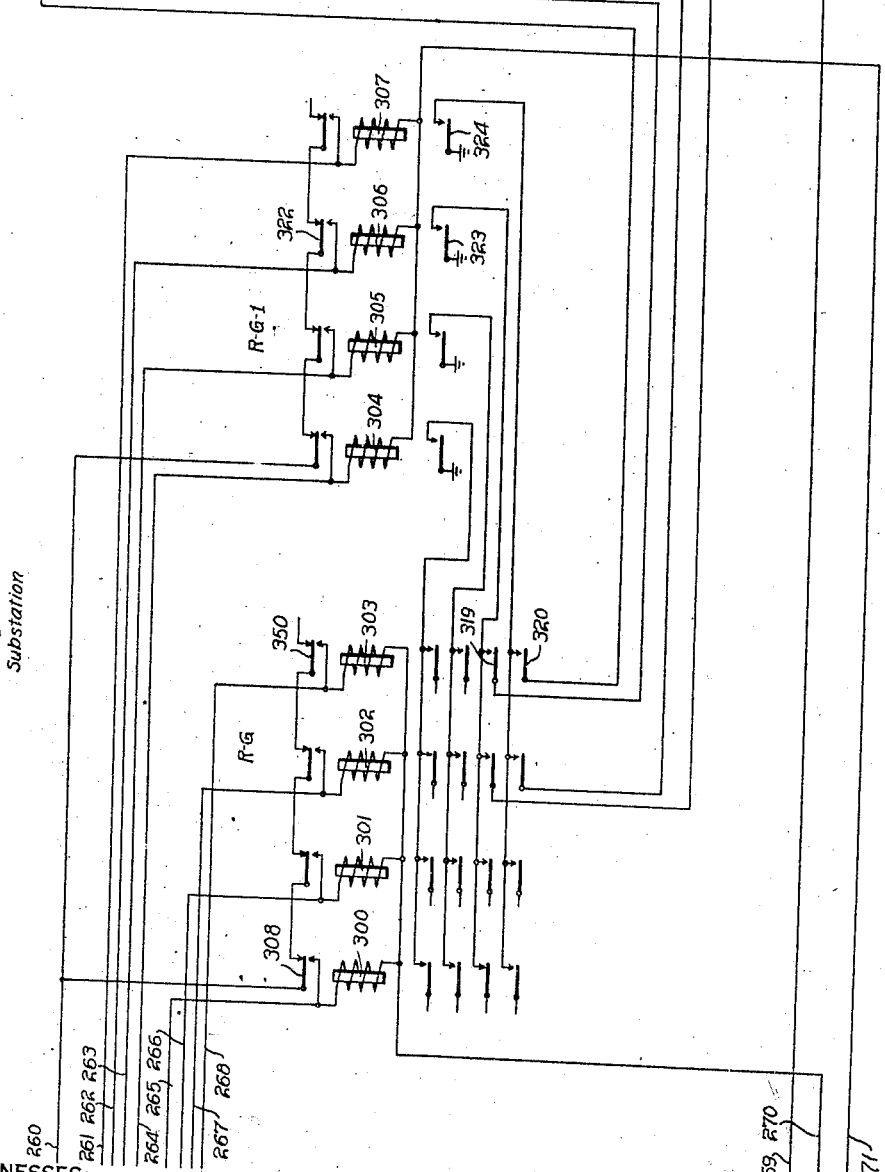

Fig. 3 shows two groups RG—1 and RG of selecting relays, the relay group RG—1 being the primary selecting group and the relay group RG being the secondary selecting group.

Figure 4:
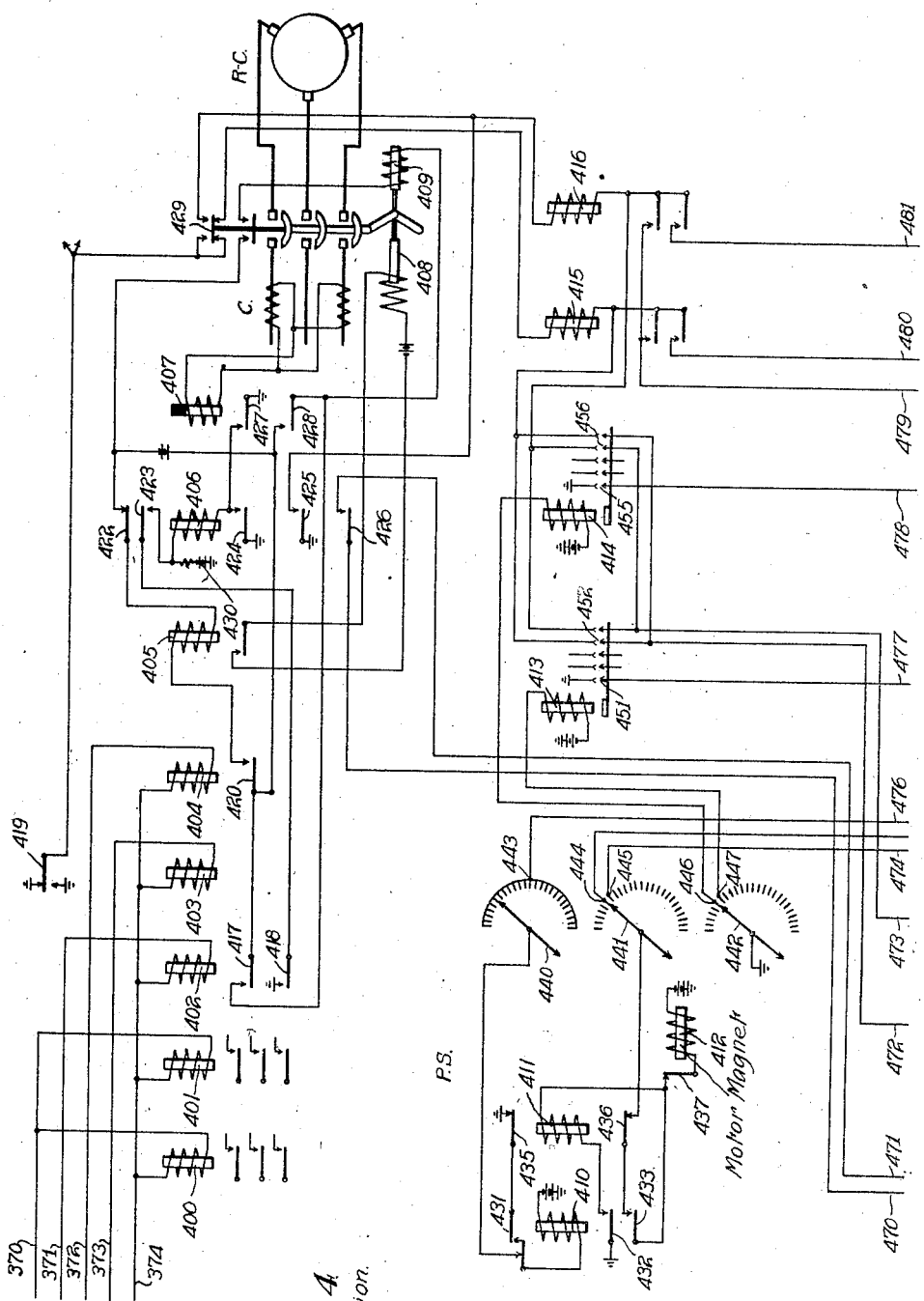

Relays 400 to 404, inclusive, Fig. 4, are those selected by the operation of the selective relays of Fig. 3. Relays 405 to 407, inclusive, control the operation of a circuit breaker C. The circuit breaker C may be any one of a number of interrupters at the substation. As shown, the circuit breaker C, in conjunction with other apparatus (not shown), is adapted to initiate the operation of a rotary converter RC.

A switch PS is somewhat similar in mechanical construction to the finder switch F and controls the operation of relays, such as 413 and 414. The relays 413 and 414 are two of a number of similar relays and are of the multi-contact type. Relays 415 and 416 are associated with the circuit breaker C and control the functioning of the code-sending equipment, as will appear later.

Relays 503 and 504, Fig. 5, are associated with relays 413 and 414 and control the operation of relays 508 and 509 in the relay group RG—3 comprising relays 505 to 509, inclusive. Relays 500 to 502, inclusive, are associated with the circuit breaker C and control the functioning of a finder switch F—1 in a manner to be described. The relays of the relay group RG—3 control the operation of a consecution control switch CCS. The consecution control switch is of the same mechanical construction as the finder switch F, previously described, and is adapted to control the sequence of the code-sending operation.

In Fig. 6, a finder switch F—1 and a code-sending switch CD—1 are shown. These switches are similar to the switches F and CD, previously described.

In Fig. 7 is shown a connector H—1 similar to the connector H described above. Relay groups RG—4 and RG—5, shown in Fig. 8, are selective relays similar to those shown in Fig. 3. Relays 800 to 803, inclusive, constituting the relay group RG—2, control the operation of supervisory lamps L.

Line switches LS and LS—1 of Fig. 9 are two of a plurality of line switches under the control of a master switch MS of the type illustrated in Aitken's "Automatic Telephony" vol. 2, page 206. The line switches, such as LS, are of the ordinary Keith or plunger type, and the plungers of all the line switches are maintained before an idle trunk by the operation of the master switch MS. The line switches, such as LS, are of the well-known self-alining type. That is, after being operated when they are released, they are immediately placed under the control of the master switch. The master switch MS is of the usual type and is adapted to govern the trunk selecting operation of all the line switches, such as LS.

A switch CCS—1 is similar to the finder switch F, previously described, in mechanical construction. In the left of Fig. 9 are shown the banks of the finder switch F—1, and the banks of the code-sending switch CD—1, thus illustrating the manner in which the line switches are connected to the bank contacts in order to secure proper operation.

The apparatus shown in the drawings having been described, its detailed operation will now be explained.

For this purpose, it will be assumed that the circuit breaker C closes. The closure of this circuit breaker may occur in response to the ordinary automatic control equipment at the substation. This equipment has not been shown in the drawings, as it is not a part of the present invention and is well known. In operating, the circuit breaker C connects the rotary converter RC to the alternating current circuit in the usual manner. Of course, there are other functions to be performed, but these will be handled by other automatic controlling devices. The closure of the circuit breaker C is all that we are concerned with in the present invention.

With the wipers of the preselecting switch PS in the positions shown, there will be a circuit completed extending from ground by way of wiper 442, bank contact 446 and multi-contact relay 414 to battery. The relay 414, upon operating, completes a circuit extending from ground by way of working contact of spring 455 and said spring, conductor 478, resistor 537, and relays 504 and 509 to battery. The relay 504 is operated over the above circuit to remove ground from the bank contact 547 of the switch CCS at armature 535, to establish a locking circuit for itself at the front contact of this armature, and to place ground upon the bank contact 444 at armature 534. The operation of the relay 509 places ground upon all the bank contacts, such as 546, accessible to the wiper 517 of the consecution control switch CCS, except the bank contact 546. The consecution control switch CCS will now be with its wipers in engagement with the bank contacts 544 to 548, inclusive, by reason of the deenergization of a relay, such as 504, associated with the bank contact preceding bank contact 547 in a manner that will appear more fully hereinafter.

When the circuit breaker C closes, a circuit is completed extending from ground by way of back contact and armature 419, pallet switch 429, winding of relay 416, working contact of spring 456 and said spring, conductor 473, relay 502 and armature 521 and its back contact to battery. The relay 416 is energized and operates to prepare certain circuits which will be described later. The relay 502 is energized over the above circuit and operates to prepare a circuit for the relay 628 of the code-sending switch CD—1 at armature 529, to place ground upon the bank contact 547 at armature 531, to establish a locking circuit for itself at armature 528 from ground through battery, back contact and armature 521, winding of relay 502, front contact and armature 528, conductor 481, front contact and armature of relay 416, through the relay 416, pallet switch 429 and armature 419 to ground and to momentarily complete a circuit extending from ground by way of armature 527 and its front contact, conductor 476, bank contact with which wiper 440 is in engagement, normally closed spring controlled by armature 431 and relay 410 to battery.

The relay 410, upon operating, opens its original energizing circuit at armature 431, completes a locking circuit for itself at this same armature, completes a circuit for the switching relay 411 and the motor magnet 412 in series at armature 432, and at armature 433 connects the test wiper to the above circuit at a point midway between the switching relay and the motor magnet. The motor magnet of the preselecting switch PS now operates to advance the wipers 440 to 442 inclusive, into engagement with the next set of bank contacts including the bank contact 445, the bank contact 444 having been previously grounded by the operation of the relay 504.

When engagement is made with this set of bank contacts, the short-circuit is removed from the relay 411 and this relay is energized in series with the motor magnet 412. The relay 411, upon operating, opens one point in the test circuit at armature 436, and at armature 435 opens the locking circuit of the relay 410. The relay 410 is deenergized to prepare a circuit for itself and to open the circuit of the switching relay 411, which is deenergized. The wipers 440 to 442, inclusive, of the preselecting switch now rest in engagement with the bank contact set which includes the bank contacts 445 and 447.

By reason of the grounded wiper 442 being in engagement with the bank contact 447, the relay 413 is energized and this relay operates to connect relays, such as 415 and 416, with relays, such as 501 and 502. Another result of the movement of the switch wipers is that the circuit of the relay 414 is opened. The relay 414 is deenergized to open the original energizing circuit of the relay 504. The relay 504 does not deenergize at this time, in view of the fact that its locking circuit has been previously completed.

Another result of the operation of the relay 413 is that a circuit is completed extending from ground by way of working contact of spring 451 and said spring, conductor 477, resistor 536 and relay 503 to battery. The relay 503 is operated to remove ground from the bank contact 550 at armature 533, to establish a locking circuit for itself at the front contact of this armature and to place ground upon the bank contact 445 at armature 532. The operation of the relay 503 also causes the energization of the relay 508. The relay 508 operates to disconnect ground from the bank contact 549, thus preparing a circuit that is effective upon the subsequent operation of the consecution control switch CCS.

When ground is placed upon the bank contact 547 by the operation of the relay 502, a locking circuit is prepared for the relay 510 and the relay 511 is energized. The relay 511 operates to complete a circuit for the relay 510 in series with the magnet 512 and to connect the test wiper 517 to a point midway between the switching relay and the motor magnet. There is no ground potential present upon the bank contact 546 and, consequently, the relay 510 is energized. The relay 510 operates to open the circuit of the relay 511, to establish a locking circuit for itself at armature 554 and to open one point in the testing circuit at armature 553. The relay 511 is deenergized to open the original energizing circuit of the relay 510.

Another result of the operation of the relay 510 is that a circuit is completed extending from ground by way of front contact and armature 552, conductor 562, back contact and armature 610, magnet 603, and back contact and armature 640 to battery. The magnet 603 is energized over the above circuit and, as it interrupts its own circuit at armature 610, it will operate as a buzzer to advance the switch wipers 611 to 614, inclusive, until the said wipers are brought into engagement with the bank contacts 615 to 618, inclusive. When engagement is made with this set of bank contacts, a circuit is completed extending from ground by way of wiper 614, bank contact 618, conductor 563, armature 529 and its front contact, conductor 564 and relay 628 to battery. The relay 628 is immediately operated over this circuit.

As a result of the energization of the relay 628, the circuit of the stepping magnet 603 is opened at armature 640 and, at armature 641, a circuit is completed which extends from ground by way of said armature and its front contact, winding of slow-acting relay 633, and back contact and armature 652 to battery. Another result of the energization of the relay 628 is that a circuit is closed from ground by way of wiper 655 and its associated bank contact, armature 609 and its back contact, armature 642 and its front contact and winding of relay 627 to battery. Another circuit in parallel with that described above, except that it goes by way of armature 644 and its back contact and armature 643 and its front contact, may be traced for energizing relay 625. The relay 627, upon operating, at its armature 639 closes a circuit for the relay 626.

At this point, it may be well to mention the peculiar construction of the armature 639 of the relay 627. The armature 639 is weighted and is so constructed that, when the relay 627 is deenergized, the armature 639 vibrates for some time on account of its momentum. The adjustment between the front and back contacts is so made that the armature 639, in decreasing the amplitude of its operation, first permanently opens the circuit of the relay 625. The operation of the relay 625 is without particular function at the present time. The relay 626, upon operating, at its armature 638 closes a circuit for the relay 630 and at its armature 637 establishes a circuit which extends from ground by way of armature 641 and its front contact, winding of repeating relay 600, armature 637 and its front contact, and to battery by way of back contact and armature 652 on the stepping magnet 634 of the code-sending switch CD—1.

The relay 630 is energized from a previously mentioned circuit and, upon operating, it closes a circuit at armature 646, which extends from battery by way of front contact and said armature, winding of slow-releasing relay 632, and back contact and armature 606 to ground. The relay 632 upon operating, at armature 650 closes a circuit for the slow-releasing relay 631. By the operation of the relay 631, a circuit is completed which extends from ground by way of armature 605 and its back contact, front contact and armature 649, front contact and armature 651, winding of magnet 634, wiper 657 and its associated bank contact and armature 646 and its front contact to battery. The magnet 634 is energized over this circuit and operates to place its pawl in such position as to operate the switch shaft upon its deenergization. Another result of the energization of the magnet 634 is that the circuit of the slow-releasing relay 633 is opened, as is, also, the circuit of the repeating relay 600 at the armature 652.

When the circuit of the relay 600 is closed, as previously described, this relay operates. As a result of this operation, a circuit is closed over the conductors 690 and 691 for the line relay 708 of the connector H—1 at the dispatcher's office, Fig. 7. Upon operating its armature 731, the relay 708 completes a circuit for the slow-releasing relay 706 in parallel with the stepping magnet 709. Upon attracting its armatures, the relay 706 closes a circuit for the slow-releasing relay 705 at its armature 726, at armature 727 opens one point in the release circuit, removes ground from conductor 741 at armature 724, at armature 725 closes a circuit for the relay 880, and at armature 723 places battery upon the conductor 742. The relay 705, upon operating, at its armature 721 prepares a holding circuit for itself, removes battery from the conductor 756 at armature 722, at armature 720 opens one point in the circuit of the relay 703 and at armature 719 closes a circuit for the slow-releasing relay 701.

The energization of the relay 701 merely prepares certain circuits which function later. The magnet 709, upon being energized, places its pawl in position to operate the switch shaft upon the deenergization of the magnet.

The relay 880, upon energizing, establishes a locking circuit for itself at armature 884 to ground by way of armature 887 of the relay 882 and its back contact. A further result of the energization of the relay 880 is that, at armature 883, a circuit is prepared for placing ground on the conductor 184.

Now, when the circuit of the relay 600 in the code-sending switch CD—1 is opened by the energization of the magnet 634, previously described, this relay is deenergized to open the circuit of the relay 708 of the connector H—1. The deenergization of the line relay 708 opens the circuit of the slow-releasing relay 706 and also the circuit of the magnet 709. The retraction of the armature of the magnet 709 causes its associated pawl to advance the switch shaft carrying the switch wipers 735 to 738, inclusive, into engagement with the first set of bank contacts. The operation of the connector H—1 from its normal position closes a circuit for the relay 707. The relay 707, upon operating, places ground upon the conductor 746 at the armature 729, opens the original energizing circuit of the relay 880 at armature 730, and, at armature 728, closes a circuit for the relay 870. The relay 870, upon attracting its armatures, closes a locking circuit for itself at the armature 871, and at armature 872 closes a circuit for an audible alarm (not shown) and the alarm lamp 873. The attention of the load dispatcher is thus drawn to the fact that an operation has been performed at the substation.

Referring now to the code-sending switch CD—1, it will be remembered that the energization of the stepping magnet 634 also opened the circuit of the slow-releasing relay 633. After a short interval, this relay is deenergized and opens the circuit of the stepping magnet 634 at armature 651. The magnet 634 is immediately deenergized to advance the wipers 655 to 658, inclusive, into engagement with the first set of bank contacts and, at armature 652, closes the circuit of the repeating relay 600 and also the circuit of the relay 633. The relay 633 is energized to close the circuit of the stepping magnet 634 and the repeating relay 600 is energized to close the circuit of the line relay 708 to the connector H—1. The alternate operation of the slow-releasing relay 633 and the stepping magnet 634 continues until the wipers 655 to 658, inclusive, are brought into engagement with the bank contact set which includes the contact 661. When this occurs, a circuit is completed extending from ground by way of front contact and armature 552, conductor 562, wiper 613, bank contact 617, bank contact 661, wiper 656 and relay 601 to battery.

The relay 601 is energized over this circuit and operates, at armature 605, to open the circuit of the stepping magnet 634 and to prepare another circuit at the front contact of this armature for the said magnet. An additional result of the operation of the relay 601 is that the circuit of the slow-releasing relay 632 is opened at armature 606. After a short interval of time, the relay 632 is deenergized to open the circuit of the slow-releasing relay 631. Upon the retraction of the armature 649 of the relay 631, a circuit is completed extending from ground by way of armature 605 and its front contact, the back contact and the armature 649, front contact and armature 651, winding of stepping magnet 634, wiper 657 and its associated bank contact, and armature 646 and its front contact to battery.

The magnet 634 is energized over this circuit and actuates its armatures to position its associated pawl, to open the circuit of the slow-releasing relay 633, and also to open the circuit of the repeating relay 600. The slow-releasing relay 633 is deenergized, after an interval of time, to open the circuit of the stepping magnet 634, which is deenergized, to again close the circuit of the slow-releasing relay 633 and to close the circuit of the repeating relay 600. By the movement of the switch wipers, occurring responsive to the energization of the magnet 634, the circuit of the relay 601 is opened and this relay is deenergized to open the circuit of the magnet 634 at armature 605, at the back contact of this armature to prepare another circuit for the magnet, and to close a circuit at armature 606 for the relay 632. The operation of the relay 632 closes a circuit for the relay 631. The operation of the relay 631 closes the original stepping circuit of the magnet 634. The alternate operation of the relay 633 and the magnet 634 again occurs until the wipers 655 to 658, inclusive, are advanced into engagement with the bank contact set which includes the bank contact 663.

During the operation of the code-sending switch CD—1, while its wipers were rotated in search of the contact set which includes the bank contact 661, the circuit of the relay 600 was intermittently opened and, consequently, the circuit of the line relay 708 of the connector H—1. It is true that the operation of the slow-releasing relay 633 indirectly controls the speed of the operation of the repeating relay 600 and the speed of operation of the line relay 708 of the connector H—1. It is also true that, at each deenergization of the relay 708, the circuit of the slow-releasing relay 706 is opened. In order to obviate any false operation, which would occur were the relay 706 to be deenergized between deenergizations of the relay 633 in the switch CD—1, the time constant of the slow-releasing relay 633 is materially faster than the time constant of the slow-releasing relay 706.

Each time the circuit of the line relay 708 is opened, this relay is deenergized to open the circuit of the slow-releasing relay 706 and also the circuit of the stepping magnet 709. The magnet 709 is thus deenergized a plurality of times to advance the wipers 735 to 738, inclusive, into engagement with the bank contact set, which corresponds to the number of impulses sent over the trunk line, as determined by the number of steps that the code-sending switch CD—1 has taken to find the bank contact set including the contact 661. It will be assumed that the bank contact set selected by the connector H—1 includes the contact 760.

As the wipers of the connector H—1 have been rotated past the normal set of bank contacts, the original energizing circuit of the slow-releasing relay 705 is opened. However, the relay 705 is not deenergized until the termination of the first series of impulses. This result is by reason of the fact that, at each retraction of the armature 731 of the line relay 708, a circuit is closed for the relay 705.

By the deenergization of the relay 705 at the end of the first series of impulses, the circuit of the slow-releasing relay 701 is opened at armature 719, at armature 720 a circuit is prepared for the relay 703, and a circuit is closed at armature 722 which extends from battery by way of back contact and armature 722, conductor 757, winding of relay 808, conductor 747, bank contact 760, wiper 735, front contact and armature 710, and front contact and armature 726 to ground. The relay 808 is energized over this circuit and operates to open the locking circuits of the relays in the group RG—5 at the armature 825, to close its locking circuit at the front contact of this armature to ground on the conductor 746, which has been grounded previously by the operation of the relay 707. Another result of the energization of the relay 808 is that, at the armature 826, a selecting circuit is prepared.

Returning now to the operation of the code-sending switch CD—1, when the wipers 655 to 658, inclusive, are brought into engagement with the bank contact set which includes the contact 663, as previously described, a circuit is completed which extends from ground by way of front contact and armature 552, conductor 562, wiper 612, bank contact 616, conductor 561, bank contact 544, wiper 515, wiper 516, bank contact 545, front contact and armature 530, conductor 566, bank contact 663, wiper 656 and relay 601 to battery.

The relay 61 is energized over the above circuit and operates, as before, to open the circuit of the stepping magnet 634 at the armature 605 and to open the circuit of the slow-releasing relay 632 at armature 606. The slow-releasing relay 632 is deenergized to open the circuit of the slow-releasing relay 631, which also retracts its armature. As a result of the latter operation, the stepping magnet 634 is operated to open the circuit of the interrupter relay 633, which retracts its armature to open the circuit of the stepping magnet 634. The magnet 634 is thus deenergized to advance the switch wipers 655 to 658, inclusive, into engagement with the next set of bank contacts. As a result of this operation, the circuit of the relay 601 is opened and this relay retracts its armatures.

The deenergization of the relay 601 opens the circuit of stepping magnet 634 and closes a circuit for the slow-releasing relay 632. The relay 632 is energized to establish a circuit for the relay 631. The latter relay, upon being energized, reestablishes the circuit of the stepping magnet 634. The stepping magnet 634 now intermittently operates to advance the wipers 655 to 658, inclusive, until they are brought into engagement with the twenty-fifth set of bank contacts.

During the second advancement of the wipers of the code-sending switch, each time the stepping magnet 634 operates, the circuit of the repeating relay 600 is opened and this relay retracts its armature to produce a corresponding number of interruptions in the circuit of the line relay 708 of the connector H—1. Upon each retraction of the armature 731 of the relay 708, the circuit of the stepping magnet 709 is opened and the magnet operates to advance the wipers 735 to 738, inclusive, into engagement with the bank contact set which corresponds to the number of impulses sent over the trunk line, as determined by the second movement of the wipers of the code-sending switch CD—1. It will be assumed that this contact set includes the bank contact 761.

When the wipers of the connector H—1 are brought into this position, no more impulses are sent over the trunk line until the slow-releasing relays 633 and 632 of the code-sending switch CD—1 are deenergized. During the advancement of the switch wipers to their second position, the operation of the armature 731 causes the energization of the relay 703. The operation of this relay is without function at the present time. When the wiper 736 engages the ninth, eleventh and thirteenth set of bank contacts, a circuit is completed for the relay 704. The relay 704 upon being energized, closes a circuit for the slow-releasing relay 701 at the armature 715, at the armature 717 prepares a circuit for maintaining itself energized, at armature 716 opens the circuit of the relay 703, and at armature 718 disconnects the battery from the conductor 756. The deenergization of the relay 703 is without function at this time.

A short interval of time after the wipers 735 to 738, inclusive, of the connector H—1 have been rotated into engagement with the bank contact set including the contact 761, the circuit of the slow-releasing relay 704 is opened. The relay 704 retracts its armatures, thereby opening the circuits of the slow-releasing relay 701 at armature 715, preparing a circuit at armature 716 for the slow-releasing relay 703 and, at armature 718, completes a circuit which extends from battery by way of said armature and its back contact, conductor 756, winding of relay 805, conductor 753, bank contact 761, wiper 735, front contact and armature 710 to ground by way of front contact and armature 726. The relay 805 is energized over this circuit and operates to establish a locking circuit for itself at armature 819, and to prepare a circuit at armature 820 for energizing the relay 800.

As previously described, the code-sending switch CD—1 is stepped around to its twenty-fifth position after the termination of the second series of impulses. The wipers of the connector switch H—1 are also stepped in synchronism with the wipers of the code-sending switch CD—1 and are brought to rest in engagement with their twenty-fifth set of contacts.

In the code-sending switch CD—1, the operation of the wipers 655 to 658, inclusive, to their twenty-fifth set of bank contacts opens the circuit of the relay 627 and also the energizing circuit of the slow-releasing relay 625. The relay 627 immediately retracts its armature. By reason of the peculiar construction of the armature 639, previously described, this armature vibrates for an interval of time, thus alternately closing the circuits of the slow-releasing relays 626 and 625. For the reason explained previously, the relay 625 is the first to retract its armatures. The deenergization of the relay 625 prepares a circuit for the relay 602.

Another result of the switch wipers of the code-sending switch CD—1 being brought into engagement with the twenty-fifth set of bank contacts is that a circuit is completed extending from ground by way of wiper 655, bank contact 660, and winding of relay 629 to battery. The relay 629 operates to open another point in the energizing circuit of the relay 625 at armature 644 and to close the circuit of the relay 602 at the armature 645.

Upon being energized, the relay 602 operates to establish another circuit for the relay 628 at armature 608 and to close a circuit at armature 607 which extends to ground by way of said armature and its front contact, wiper 611, bank contact 615, conductor 560 and winding of relay 500 to battery. The relay 500 is energized over the above circuit and operates to establish a locking circuit for itself in series with the relay 416 at armature 520, and at armature 521 to open the circuit of the relay 502 and also the original energizing circuit of the relay 416. The relay 502 is deenergized to open the circuit of the relay 510 at armature 531 and to restore certain other circuits to normal.

The relay 510 is deenergized to remove ground from the conductor 562 at armature 552, to prepare a circuit for the relay 511 at armature 555, and to complete a circuit extending from battery by way of back contact and armature 566, wiper 519, bank contact 548, and winding of relay 504, to battery. This circuit serves to shunt the relay 504, which is deenergized. The removal of ground from the conductor 562 opens the starting circuit of the finder switch F—1. The relay 504 is deenergized to remove ground from the conductor 475 and to replace ground upon the bank contact 547. The replacement of ground upon the bank contact 547 causes the energization of the relay 511. A circuit is now completed extending from ground by way of wiper 518, armature 555 and its back contact, and winding of relay 511 to battery.

The relay 511, upon operating, completes a circuit for the switching relay 510 and for the motor magnet 512 in series at armature 558, and at armature 557 connects the wiper 517 to the above circuit at a point between the switching relay and the motor magnet. As there is ground present on all the bank contacts associated with the wiper 517, except the bank contact 549, the switching relay 510 will be short-circuited by reason of the relay 503 being operated, and the motor magnet 512 will operate to advance the switch wipers 515 to 519, inclusive, one step into engagement with the bank contact set comprising the bank contacts 544 to 548, inclusive. When the switch wipers are brought into engagement with this set of bank contacts, there being no ground potential present upon the bank contact 546, the short-circuit will be removed from the winding of the relay 510 and the switching relay will operate in series with the motor magnet, the latter remaining inoperative by reason of the high resistance of the switching relay.

The relay 510, upon operating, opens the circuit of the line relay 511 at armature 555, opens the testing circuit at armature 553, and at armature 556 removes the short-circuit from the winding of the relay 504. When the circuit of the relay 511 is opened, this relay is deenergized to open the circuit of the relay 510 and to open another point in the testing circuit. The relay 510 is deenergized because there is no ground present upon the bank contact 549.

By the operation of the consecution control switch CCS, circuits are prepared whereby, when the next circuit breaker operates, a code identifying this operation will be transmitted immediately to the dispatcher's office. The manner in which this sequence is maintained, when a plurality of interrupters operate in quick succession before the code-sending apparatus has had time to function, is by the conjoint operation of the preselecting switch PS, the trunk selecting relays, such as 413 and 414, the locking relays, such as 503 and 504, and the consecution control switch CCS. These operations will be described more fully hereinafter.

Referring now to the operation of the equipment at the dispatcher's office, in the connector H—1, the relay 703 which has been energized by the operation of the armature 731 on the line relay 708 is deenergized, by reason of the cessation of the operation of the armature 731. The operation of this relay is without function for the present. The relay 702 is also deenergized. These results are caused by the fact that the repeating relay 400 is retained energized for an interval after the wipers of the code-sending switch CD—1 engage the twenty-fifth set of bank contacts. Upon retracting its armatures, the relay 702 closes a circuit, which extends from ground by way of back contact and armature 713, conductor 755, winding of low resistance relay 882, armature 826 and its front contact, front contact and armature 820 and winding of relay 800 to battery. This circuit serves to energize the relay 800. The energization of the relay 800 closes a circuit for the supervisory lamp 818 and opens the circuit of the supervisory lamp 817. By reason of these changes in the supervisory signalling devices, the dispatcher is appraised of the change in position of the circuit breaker C at the substation. The operation of the relay 882 opens the locking circuit for the relay 880 at armature 887. The relay 880 immediately retracts its armatures. The relays 880 and 882 are provided for the purpose of checking the operation of the supervisory signalling devices, as will appear more fully hereinafter.

Returning now to the operation of the code-sending switch CD—1, the slow-releasing relay 626 is finally deenergized and it opens the circuit of the relay 600 at armature 637 and, at armature 638, it opens the circuit of the relay 630. The deenerization of the relay 630 opens the circuit of the slow releasing relay 632 at armature 646 and, at armatures 647 and 648, completes a circuit which extends from ground by way of armature 648 and its back contact, winding of stepping magnet 634, armature 647 and its back contact, the twenty-fifth bank contact with which the wiper 658 is in engagement, said wiper, and back contact and armature 652 to battery. The stepping magnet 634 is energized over this circuit and operates to restore the wipers 655 to 658, inclusive, to their normal positions, whereupon the circuit of the magnet 634 is opened and its operation ceases.

As a result of the wipers of the code-sending switch being brought to their normal position, the circuit of the relay 629 is opened and this relay retracts its armatures to open the circuit of the relay 602. The slow-releasing relay 632, upon retracting its armature, opens the circuit of the slow-releasing relay 631, which is also deenergized. The relay 602, upon retracting its armatures, opens the circuit of the relay 628 at armature 608, and at armature 607 opens the original energizing circuit of the relay 500. The relay 500 is not deenergized at this time by reason of the fact that it is maintained energized in series with the relay 416 until the circuit breaker C changes its condition. The deenergization of the relay 628 in the code-sending switch CD—1 merely restores certain circuits to their normal condition. The deenergization of the relay 600, which occurred immediately after the deenergization of the slow-releasing relay 626, opens the circuit of the line relay 708 of the connector H—1.

As the circuit of the relay 708 is opened, this relay is deenergized to open the circuit of the slow-releasing relay 706. Upon retracting its armatures, the relay 706 closes a circuit for the stepping magnet 709 which extends from battery by way of wiper 737 in engagement with the twenty-fifth bank contact, said bank contact, the back contact and armature 732, back contact and armature 727, and winding of stepping magnet 709 to ground. The stepping magnet 709 operates to restore the wipers 735 to 738, inclusive, to their normal position.

In the above described manner, the apparatus is released following the sending of the supervisory signal to the dispatcher, notifying him of the automatic operation occurring in the substation.

It will be noted that the supervisory signal 818 is not actuated immediately after the two series of impulses which caused its selection. It is operated when the wipers of the connector H—1 are brought into their twenty-fifth position and remain there for an interval. By this circuit arrangement, false operation of the supervisory signals is prevented, because, should either the switch CD—1 in the substation or the connector H—1 in the dispatcher's office get out of synchronism with the other, the wipers of each of the switches will not be in their twenty-fifth position simultaneously. Consequently, the supervisory signals will not be operated. When there is no change in the supervisory signals, the relay 882 is not energized. Consequently, the relay 880 remains energized. Now, when the relay 706 is deenergized, as before described, a circuit is completed extending from ground by way of armature 728 and its back contact, conductor 740, armature 883 and its front contact, conductor 184, and winding of relay 191 to battery. The relay 191, upon being energized, causes the finder switch F and the code-sending switch CD to function to send out a checking code, the results of which will be described subsequently.

In the same manner as above described, any change in position of any of the contactors, or other apparatus units, causes the finder switch F—1, the code-sending switch CD—1 and the connector H—1 to be operated to control the actuation of the supervisory signals. The manner in which supervisory signals are sent to the dispatcher when a plurality of breakers operate in quick succession will be described later.

It will now be assumed that the circuit breaker C at the substation is closed and that the load dispatcher desires to open it. In order to accomplish this result, the dispatcher operates the double-throw key K in a direction to momentarily close the springs shown on the right.

The operation of the key K closes a circuit which extends from the positive pole of the battery B by way of the working contact of spring 100, said spring, winding of relay 106, conductor 183, front contact and armature 814 and to ground. The relay 106 is energized over this circuit and operates to establish a locking circuit for itself, at armature 173, over a path extending from the positive pole of battery B, armature 173 and its front contact, spring 177 and its resting contact, winding of relay 106, conductor 183, and front contact and armature 814 to ground. The operation of the armature 172 of the relay 106 closes a circuit for the monitoring lamp 174. This lamp remains lighted through the sending operation, even after the key K restores to normal, in order to inform the dispatcher that the desired code is being sent. Another result of the energization of the relay 106 is that, at armature 104, a circuit is completed which extends from ground by way of armature 104 and its working contact, winding of stepping magnet 109 of finder switch F, armature 132 and its back contact, and back contact and armature 120 to battery. As the stepping magnet 109 interrupts its own circuit, it operates as a buzzer to advance the switch wipers 123 to 126, inclusive, until they are brought into engagement with the bank contacts 127 to 130, inclusive, which is the contact set associated with the key K in the finder F.

When the switch wipers are brought into engagement with this set of bank contacts, a circuit is closed which extends from ground through the winding of relay 108 by way of the common conductor 134, which is common to all the keys in the group, front contact and armature 101, bank contact 130, wiper 126 and relay 113 to battery. The relay 113 is energized over this circuit and, upon operating, opens the circuit of the stepping magnet 109, thus stopping the operation of the finder switch, and closes a circuit for the relay 111 extending from battery by way of armature 120 and its front contact, winding of relay 111, bank contact with which wiper 160 is in engagement and said wiper to ground, and at armature 121 closes a circuit which extends from ground by way of armature 121 and its front contact, winding of slow-releasing relay 143, and armature 152 and its back contact to battery. The relay 111, upon being energized, closes a circuit for the slow-releasing relay 110 at its armature 117.

The armature 117 of the relay 111 is constructed in a manner similar to the armature of the relay 627 of the code-sending switch CD—1 and, consequently, when the relay 111 becomes deenergized, the armature 117 vibrates for an interval of time afterwards, the relay 110, upon operating, at armature 115 closes a circuit for the relay 140 and, at armature 116, establishes a circuit which extends from ground by way of armature 121 and its front contact, winding of repeating relay 144, front contact and armature 116 and armature 152 and its back contact to battery. The repeating relay 114, upon operating, at its armature 154 closes a bridge across the conductors 180 and 181 extending to the substation, whereby the line relay 200 of the connector H is energized.

The line relay 200, upon operating closes a circuit for the slow releasing relay 202 in parallel with the stepping magnet 207. The stepping magnet 207 is energized to place its associated pawl in position to actuate the switch shaft. The slow-releasing relay 202, upon being energized, closes a circuit for the slow-releasing relay 203. The latter relay operates to energize the slow-releasing relay 206. The operations of these relays have the same functions as described in connection with the connector H—1.

Returning now to the operation of the code-sending switch CD, the relay 140, upon operating, at its armature 148 closes a circuit for the slow-releasing relay 141. The relay 141, upon attracting its armature, establishes a circuit for the slow-releasing relay 142. The latter relay, upon being energized, closes a circuit which extends from ground by way of armature 155 and its back contact, front contact and armature 151, front contact and armature 153, winding of magnet 146, wiper 162 and its associated bank contact, and armature 148 and its front contact to battery. The stepping magnet 146 is energized over this circuit and operates to place its associated pawl in position to actuate the switch shaft and also to open the circuit of the relays 144 and 143 at the armature 152. The deenergization of the relay 144 opens the circuit of the line relay 200 of the connector H at the substation.

The slow-releasing relay 143, upon being deenergized, opens the circuit of the stepping magnet 146, which is also deenergized, to reestablish the circuit of the relays 143 and 144, and to advance the switch wipers 160 to 163, inclusive, into engagement with their first set of bank contacts. The stepping of the code-sending switch CD continues under the control of the slow-releasing relay 143 until the wipers of the switch are brought into engagement with the contact set which includes the contact 165. When this occurs, a circuit is completed that extends from ground by way of armature 103 of relay 106 and its front contact, wiper 125, bank contact 129, bank contact 165, wiper 161 and winding of relay 145 to battery.

The relay 145 is energized over this circuit and, upon operating, opens the circuit of the stepping magnet 146 at armature 155, at the front contact of this armature prepares another circuit for the magnet and at armature 156 opens the circuit of the slow-releasing relay 141. The rotation of the switch, of course, ceases.

The slow-releasing relay 141, upon being deenergized, opens the circuit of the slow-releasing relay 142. After a short interval, the slow-releasing relay 142 retracts its armature and closes a circuit which extends from ground by way of armature 155 and its front contact, back contact and armature 151, front contact and armature 153, winding of the stepping magnet 146, wiper 162, bank contact with which said wiper is in engagement, and front contact and armature 148 to battery. The stepping magnet 146 operates to attract its armature, thereby placing the pawl in actuating position and opening the circuit of the slow-releasing relay 143 and also the circuit of the relay 144.

In accordance with the first operation of the code-sending switch CD, a series of interruptions is produced in the circuit of the line relay 200 of the connector H. This relay is deenergized a plurality of times in response thereto. As a result of the retractions of the armature 209, the circuits of the slow-releasing relay 202 and the magnet 207 are opened. The deenergizations of the magnet 207 serve to advance the switch wipers 225 to 228, inclusive, in engagement with the bank contact set which corresponds to the number of impulses sent over the trunk line and, consequently, the position of the wipers 160 to 163, inclusive, of the code-sending switch CD. At the first off-normal step of the switch, the relay 201 is energized to ground the conductor 260. It will be assumed that the bank contact set to which the wipers 225 to 228, inclusive, are stepped includes the bank contact 230.

During the interval that the slow-releasing relays 141 and 142 in the code-sending switch are being deenergized, the slow-releasing relay 203 of the connector H, which has been maintained energized by the continued operation of the armature 209, is deenergized. As a result of this operation, a circuit is completed which extends from ground by way of armature 211 and its front contact, armature 221 and its front contact, wiper 225, bank contact 230, conductor 262, winding of relay 306, conductor 271, and armature 215 and its back contact to battery. The relay 306 is energized over this circuit and operates to close a locking circuit for itself at armature 322 to ground on the conductor 260.

Returning now to the operation of the code-sending switch CD, the deenergization of the slow-releasing relay 142 closes a circuit for the magnet 146 which is energized to place its associated pawl in actuating position and to open the circuit of the slow-releasing relay 143 and also the circuit of the repeating relay 144. The slow-releasing relay 143, upon being deenergized, opens the circuit of the stepping magnet 146, which is deenergized. The retraction of the armatures of the magnet 146 advances the switch wipers another step and also closes the circuit of the interrupting relay 143 and the repeating relay 144. By the movement of the switch wipers, the circuit of the relay 145 is opened and this relay retracts its armatures to open the circuit of the magnet 146 and to close the circuit of the slow-releasing relay 141. The energization of the relay 141 closes the circuit of the relay 142.

The operation of the relay 142 again starts the operation of the stepping magnet 146. The magnet 146 is now intermittently operated to advance the wipers 160 to 163, inclusive, into engagement with the bank contact set, which includes the contact 166. A circuit is now closed which extends from ground by way of armature 103 of relay 106 and its front contact, armature 119 of relay 108 and its front contact, wiper 124, bank contact 128, bank contact 166, wiper 161 and winding of relay 145 to battery. The relay 145 is energized to momentarily stop the operation of the switch wipers in the same manner as before described.

The repeating relay 144 operates to interrupt the circuit at the line relay 200 of the connector H in the same manner as before during the second movement of the wipers of the switch. The line relay 200 operates to control the operation of the stepping magnet 207 in advancing the wipers 225 to 228, inclusive, into engagement with the proper bank contact set, which, it will be assumed, includes the bank contact 231. At the termination of this series of impulses, the slow-releasing relay 204, which has been energized while the switch wipers were being rotated past the twelfth, thirteenth and fourteenth set of bank contacts and has been maintained energized by the operation of the line relay 200, is deenergized. A circuit is then closed which extends from ground by way of front contact and armature 211, armature 221 and its front contact, wiper 225, bank contact 231, conductor 268, winding of relay 303, conductor 270, armature 219 and its back contact to battery. The relay 303 is operated over this circuit and attracts its armatures to establish a locking circuit for itself at the armature 350 and to prepare a circuit at the armature 319 for the relay 402 in the substation.

Going back now to the operation of the code-sending switch CD, the slow-releasing relays 141 and 142 operate, as before, and the magnet 146 is intermittently operated after an interval of time to advance the wipers 160 to 163, inclusive, into engagement with the twenty-fifth set of bank contacts.

When the wipers 160 to 163, inclusive, are brought into engagement with the twenty-fifth set of bank contacts, the circuit of the stepping magnet 146 is opened and its operation ceases temporarily. A circuit is also completed which extends from ground by way of wiper 160 and its associated twenty-fifth bank contact, and winding of relay 112 to battery. The relay 112 is energized to prepare a circuit for the stepping magnet 109, the function of which will be described subsequently. Another result of the rotation of the wipers to the twenty-fifth position is that the circuit of the relay 111 is opened. The relay 111 is immediately deenergized to cause its armature 117 to vibrate. The relay 110 is thus maintained energized for an interval after the relay 111 is deenergized. In the same manner as before described, the wipers of the connector H are brought into engagement with their twenty-fifth set of bank contacts.

Now, during the interval that the relay 110 in the dispatcher's office is maintained energized, the slow-releasing relay 205 in the connector H at the substation is deenergized and a circuit is completed which extends from battery by way of the back contact and armature 220, conductor 269, conductor 374, winding of relay 402, conductor 371, armature 319 and its front contact, and front contact and armature 323 to ground. The relay 402 is operated over the above circuit to complete a circuit for the tripping coil 409 of the circuit breaker C. The circuit breaker C operates to disconnect the rotary converter RC, and to open the circuit of the relay 416 at the pallet switch 429.

In addition to the relay 416 being deenergized, the locking circuit of the relay 500 is opened and this relay is deenergized to prepare a circuit for the relays 501 and 502. As the circuit breaker C is now in an open position, a circuit is completed extending from ground by way of armature 419 and its back contact, pallet switch 429, winding of relay 415, working contact of spring 452 and said spring, conductor 472, relay 501 and back contact and armature 521 to battery. The relay 501 is operated to establish a locking circuit for itself at armature 523, to prepare circuits for the code-sending switch CD at armatures 524 and 525, to place ground upon the bank contact 550 at armature 526 and to complete a circuit momentarily, at armature 522, for the line relay 410 of the preselecting switch PS. The preselecting switch now takes one step in the same manner as before described, and the relay 413 is deenergized and another relay similar to it is energized. By the grounding of the bank contact 550, the line relay 511 of the consecution control switch CCS is energized, as is the switching relay 510.

The code-sending operation now takes place in the same manner as before described, except for a slight difference in the equipment at the dispatcher's office which occurs by reason of the relay 106 being locked energized when the lamp 818 is lighted. By the deenergization of the relay 800, which occurs by the sending back of the code, the retraction of the armature 814 of the relay 800 causes the relay 106 to be deenergized. The deenergization of the relay 106 opens the operating circuit of the finder switch F and the code-sending switch CD, insuring that the operating code will not be sent to the substation again.

The locking relay 106 also provides means whereby, if, for some reason or other the code is not transmitted properly either to the substation or to the dispatcher's office, the sending operation will reoccur in both directions until the corresponding contactor or apparatus unit is operated and the corresponding supervisory signals are operated at the dispatcher's office.

Returning now to the operation of the code-sending switch CD, it will be remembered that the circuit of the slow-releasing relay 110 is finally opened by the cessation of the vibration of the armature 117. The relay 110, upon being deenergized, opens the circuit of the slow-acting relay 140 at the armature 115, at the armature 116 opens the circuit of the relay 144, and at the armature 114 closes a circuit that extends from battery by way of front contact and armature 118, armature 114 and its back contact, back contact and armature 132, winding of stepping magnet 109 and the front contact and armature 104 to ground. The magnet 109 is operated over this circuit to advance the wipers 123 to 126, inclusive.

The slow-releasing relay 140, upon being deenergized, opens the circuit of the slow-releasing relay 141 and closes a circuit that extends from ground by way of armature 147 and its back contact, winding of stepping magnet 146, armature 149 and its back contact, bank contact with which wiper 163 is in engagement and said wiper, and armature 152 and its back contact to battery. The magnet 146 operates to restore the wipers 160 to 163, inclusive, to normal position. By this operation, the circuit of the relay 112 is opened and this relay is deenergized to open the circuit of the stepping magnet 109 of the finder switch F, whereby the rotation of the wipers of the finder switch ceases. The slow-releasing relay 141, upon retracting its armatures, opens the circuit of the slow-releasing relay 142.

Responsive to the deenergization of the relay 144, the line relay 200 of the connector H is released and the relay retracts its armature to cause the restoration of the connector H in the manner described in connection with the connector H—1.

In the manner above described, the connection is released in response to the transmission of the sending operation.

The reason that the finder switch F is given a number of steps at the end of the code-transmitting operation is to permit the calls to be evenly distributed over the group of keys. To explain more fully, assuming that another relay, such as 106, is operated in addition to said relay, by the momentary operation of another key, such as K, if it were not for the provision mentioned, the code corresponding to the operated relay would be transmitted indefinitely until the proper answer-back signal is recorded on the lamps, and there would be no actuating code sent out for the other relay, which was operated. By means of the circuit arrangement shown, this difficulty is obviated and one transmitting operation cannot indefinitely prevent the remaining operations.

The relay 113, of course, is deenergized as soon as the switch wiper 126 is rotated from engagement with the bank contact 130 and the circuit of the stepping magnet 109 is closed. If no other relay, such as 105 or 106, is operated, the finder switch F may again rotate the wipers 123 to 126, inclusive, into engagement with the bank contacts 127 to 130, inclusive.

In case the dispatcher momentarily operates the key K in the other direction, thus operating the springs shown at the left, the relay 105 is locked energized and the code for closing the interrupter C is sent out, although the wipers 123 to 126, inclusive, of the finder switch F are brought into engagement with the bank contacts 127 to 130, inclusive. The difference in the code is because of the fact that the common relay 108 is not energized at this time, and, consequently, the wipers of the code-sending switch CD are first stopped in engagement with the bank contact set which includes the contact 164. The operation of the finder F, the code sender CD and the connector H causes the selection of the relay 405 at the substation. This relay functions to close the circuit breaker C.

The dispatcher is also provided with a checking key K—5 which controls the energization of the relay 191. The relay 191, upon energizing, causes the operation of the finder F and the code sender CD to control the movement of the connector H at the substation whereby it is possible to send out a certain code which will operate the relay 403.

It will be seen that the operation of the relay 403 momentarily removes ground from the common conductor extending to the contacts of all the pallet switches, such as 429, on the circuit breakers, such as C. This momentary removal of ground causes the release of relays, such as 415 and 500 that are locked in energized position.

By the reoperation of relays, such as 415 and 416, in series with relays, such as 501 and 502, the checking codes to check the position of all the circuit breakers in the system will be sent back to the dispatcher's office. The preselecting switch PS will, of course, under these conditions, be stepped a plurality of times in quick succession to energize the relays 413 and 414 and relays such as 503 and 504. The codes signalling the condition of the apparatus units are sent to the dispatcher's office in the order in which the relays, such as 501 and 502 are energized. All codes will thus be sent back to the dispatcher's office.

It will be seen that the provision of the locking relays, such as 105 and 106, also renders it impossible to send an unnecessary code for the reason that, if the dispatcher should inadvertently throw the key K in the same direction as it had been thrown just previously, assuming no change in the associated apparatus unit at the substation, the relay 105 or 106, as the case may be, would not be energized and no operation would occur. As no monitoring lamp is lighted, the attention of the dispatcher is called to his mistake.

Under certain conditions, the dispatcher may find it desirable to release the connection in case he inadvertently operates a key or, for any other reason, desires to stop the sending of the code. In order to accomplish this result, it is only necessary for the dispatcher to operate the key momentarily in the opposite direction to that which he had previously thrown it. To describe this operation, it will be assumed that the key K has been thrown to the right and that the relay 106 is locked energized. To stop the sending operation, the dispatcher will throw the key to the left, thereby opening the locking circuit of the relay 106, which is deenergized to permit the sending apparatus to be restored to normal condition in the usual manner. The relay 105 is not energized at this time for the reason that the relay 800 is energized and no battery is connected to the winding of the relay 105. In the above manner, the sending apparatus including equipment at the dispatcher's office and the substation is restored to normal condition.

The operation set forth above is the normal one when any change occurs in the position of circuit breakers or other apparatus units at the substation. However, it sometimes occurs that, when the circuit breaker operates under automatic control, there will be an excessive rush of current, caused by short-circuit conditions. In this event, it is necessary to apprise the dispatcher of the existence of the abnormal condition at the substation. In order to do this, it will be assumed that the circuit breaker C closes, as before, under automatic control; and it will be assumed, further, that there is a short-circuit present. Under these conditions, the slow-to-energize relay 407 will be operated. As a result of the energization of this relay, a circuit is completed for the relay 406 at armature 427 and, at armature 428, the circuit of the tripping coil 409 of the circuit breaker C is energized.

The relay 406, upon being energized, establishes a locking circuit for itself at armature 424, at armature 423 prepares a shunt circuit, and closes a circuit at armature 425 for the relay 416 in series with the relay 502. The circuit breaker C, in tripping, completes a circuit for the relays 415 and 501 in series. As the relay 502 is energized before the relay 501, the code indicating that the breaker is closed will be first transmitted.

Another result of the operation of the relay 406 is that, at armature 426, a circuit is prepared for placing a ground potential upon the bank contact 692. The relay 510 is operated and the operation of the finder switch F—1 and the code sender CD—1 is initiated in the same manner as before described. By reason of the fact that the relay 502 is energized before the relay 501, the code transmitted will indicate that the circuit breaker C has closed.

The finder switch F—1 is now operated to rotate the wipers 611 to 614, inclusive, into engagement with the bank contacts 615 to 618, inclusive. The code-sending switch CD—1 is then operated to send a code which is the same as before, inasmuch as the relay 502 is operated. There is a difference in this code-sending operation for the reason that the relay 406 is operated. Because of this fact, there is a ground connection to the bank contact 692, and, while the third series of impulses are being sent, the wipers of the code-sending switch CD—1 will be rotated into engagement with the bank contact set which includes the bank contact 692.

Immediately upon this operation, a circuit is completed extending from ground by way of wiper 614, conductor 563, conductor 471, front contact and armature 426, conductor 470, conductor 567, bank contact 692, wiper 656 and relay 601 to battery. The energization of the relay 601 opens the circuit of the magnet 634 at armature 605, prepares another circuit for said magnet at the front contact of this armature, and at armature 606 opens the circuit of the slow-releasing relay 632.

By these operations, a pause occurs in the series of interruptions, as before described, the stepping of the code-sending switch CD—1 and the sending of the code being resumed upon the deenergization of the slow-releasing relay 631 in the manner previously described. When this pause in the sending occurs, the wipers of the connector switch H—1 will be in a corresponding relative position to the wipers of the code-sending switch, which, in this case, is the twenty-fourth set of bank contacts, and it will be assumed that the bank contact set includes the bank contact 763.

As previously described, upon the pause occurring, the slow-releasing relay 703, which has been maintained energized, during the third movement of the connector switch wipers, by the operation of the armature 731 to the line relay 708, is deenergized. As a result of this operation, a circuit is completed extending from battery by way of wiper 736, bank contact 763, armature 712 and its front contact, armature 714 and its back contact, conductor 744, and winding of relay 881 to ground. The relay 881, upon being energized, establishes a locking circuit for itself at armature 886 over a circuit extending from battery by way of front contact and armature 723, conductor 742, armature 886 and its front contact, and winding of relay 881 to ground. Another result of the energization of the relay 881 is that a certain circuit is prepared at armature 885, which will be described.

When the stepping of the code sending switch CD—1 is resumed, the interruptions in the line circuit occur as before and the wipers of the code-sending switch CD—1 and the connector H—1 are stepped in unison to their twenty-fifth positions. At this point, another pause occurs in the interruptions and the slow-releasing relay 702 in the connector switch H—1 is deenergized.

The relay 702, upon being deenergized, closes a circuit at armature 713 that extends from ground over the conductor 755 and the winding of the low-resistance relay 882, armature 826 and its front contact, front contact and armature 820, winding of relay 800 and resistor 804 to the negative pole of battery. The relays 800 and 882 are energized over this circuit. The operation of the relay 800 changes the supervisory lamp signals to indicate to the dispatcher that the circuit breaker C at the substation is closed by lighting the lamp 818.

The relay 882 upon energizing, completes a circuit which extends from the positive pole of the battery B, back contact and armature 711, conductor 743, front contact and armature 885, armature 888 and its front contact, armature 826 and its front contact, front contact and armature 820, armature 815 and its front contact, conductor 185, winding of relay 106, conductor 183 and front contact and armature 814 to ground. The relay 106 is energized over this circuit and, upon operating, establishes a locking circuit for itself extending from the positive pole of battery B by way of spring 176 and its resting contact, armature 173 and its working contact, winding of relay 106, conductor 183, and front contact and armature 814 to ground.

The battery B has its negative pole grounded. The other batteries which have been mentioned all have their positive poles grounded. It will, of course, be understood that all these batteries may be two central batteries connected in the manner indicated.

It will be noted that the relay 800, upon energizing, establishes a locking circuit for itself extending from ground by way of normally closed springs controlled by armature 176', conductor 186, front contact and armature 816, winding of relay 800, and resistor 812 to battery. The energization of the relay 106, which follows the closure of the above traced circuit, operates the armature 176'. As a result of this operation, the previously traced locking circuit for the relay 800 is opened. However, the relay 800 is maintained energized over a circuit extending from the positive pole of the battery B by way of armature 176' of relay 106 and its front contact, conductor 186, front contact and armature 816, winding of relay 800, and resistor 812 to battery. As this circuit is established before the above-mentioned locking circuit is opened, the relay 800 is maintained energized.

It will be seen that, as this circuit goes from the positive pole of the battery B to the negative pole of the other battery, these batteries are in series and, consequently, the relay 800 will be maintained energized. This statement holds true when a circuit is closed for the relay 106 by the operation of the relay 882, as previously described. The code-sending switch CD—1 at the substation and the connector H—1 in the dispatcher's office are released in the usual manner after the sending of the code.

The energization of the relay 106 initiates the operation of the finder switch F and the code-sending switch CD to send out the opening code for tripping the circuit breaker C. Inasmuch as the circuit breaker C has been tripped by the operation of the overload relay 407, the sending out of this code is merely to close the circuit for the relay 402 of the selecting relays whereby the relay 406 is deenergized. The operation of the code-sending switch CD and the connector switch H occurs in the usual manner, the relays 302 and 306 being operated in the relay groups RG and RG—1 to select the tripping relay 402.

The relay 402, upon operating, completes a circuit extending from ground by way of front contact and armature 418, armature 423 and its front contact and resistor 430 to battery. This circuit serves to shunt the relay 406, whereby this relay is deenergized to open the circuit of the relay 416 and also the locking circuit of the relay 500, which has been previously energized by the operation of the relay 602 of the finder switch F—1.

The deenergization of the relay 500 causes the relays 415 and 501 to be operated. The previous energization of the relay 500 caused the deenergization of the relay 502 and the deenergization of the relay 510. The relay 510, upon being deenergized, causes the consecution control switch CCS to move its wipers one step. When the relay 501 is again energized, the relay 510 is operated and the finder switch F—1 and the code-sending switch CD—1 are operated to generate a code of impulses which corresponds to the code signifying that the circuit breaker C is in an open position.

At the dispatcher's office, in response to this code, the connector switch H—1 is operated to close a circuit for the relays 809 and 805 whereby the relay 800 is shunted. The relay 800 is deenergized immediately to change the supervisory lamp signals and to open the circuit of the relay 106. The deenergization of the relay 106 stops the sending out of the tripping code from the dispatcher's office.

By the change in supervisory signals, first to indicate that the breaker is closed and then to indicate that the breaker is open, the dispatcher is apprised that the automatic control apparatus at the substation has attempted to close the circuit breaker and that the circuit breaker has been opened on overload.

It may sometimes occur that the dispatcher will desire to close the circuit breaker C at the substation when there is an overload condition present. In this instance, the dispatcher will proceed as before described, and the circuit breaker relay 404 will be selected by the operation of the connector H through the intermediate action of the relay groups RG and RG—1. The operation of this relay closes a circuit for the contactor or relay 405. The energization of the relay 405 closes a circuit for the closing coil 408 of the circuit breaker C. The circuit breaker C will now close. If there is a short-circuit condition present, the overload relay 407 will operate, as before, to close the circuit for the relay 406.

The relay 406 operates in the same manner as before to open the circuit of the relay 405, thereby preventing any subsequent closure of the circuit breaker C while the code is being repeated from the dispatcher's office. In addition, the energization of the relay 406 sends back a signal which will indicate that the circuit breaker has been closed. Furthermore, the operation of the lamp supervisory relay opens the circuit for sending out the code in the dispatcher's office. Another result of the operation of the lamp supervisory relay is that the relay 106 is energized, as before, to send out a proper code, whereby the relay 406 is deenergized and a code is sent back to the dispatcher to inform him of the true positions of the circuit breaker. In this case, also, the supervisory lamps indicating, first, that the circuit breaker is closed and, then, that the circuit breaker is open, show the dispacher that there is an overload condition present.

The operation of the apparatus, when two or more circuit breakers at the substation operate in quick succession will now be described. Assuming that the apparatus is in the position shown in the drawings, with the exception that the circuit breaker C is in a closed position, when the circuit breaker is tripped, the relay 415 is connected in series with the relay 501 and energized. The operation of the relay 501 causes the wipers 440 to 442, inclusive, of the preselecting switch PS to take one step and also initiates the code-sending operation by causing the operation of the relay 510 of the consecution control switch CCS. The movement of the preselecting switch PS causes the energization of another relay, such as 413, to connect the various relays, such as 415 and 416, associated with the circuit breakers to corresponding relays, such as 501 and 502. The operation of the relay 413 also causes the energization of relay 503. The operation of the relay 503 causes the operation of the relay 508, whereby ground potential is removed from the next bank contact in the set of bank contacts accessible to the wiper 517 of the consecution control switch CCS. These operations take place exceedingly fast, as the switches, such as PS and CCS, operate much faster than the power switches or apparatus units.

Now, when the circuit breaker is tripped, the relay associated with that breaker, such as 415, will be connected in series with a relay, such as 501, and the circuit thus constituted energized. By the operation of the relay 501, the preselecting switch PS is caused to take another step to select another trunk, so to speak. When the code indicating the position of the first operated circuit breaker is transmitted, the relay 503 is deenergized to cause the energization of the line relay 511 of the consecution control switch CCS and the wipers 515 to 519, inclusive, are moved one step under the control of the motor magnet 512. By these operations, circuits are prepared for sending out a code showing the position of the second operated circuit breaker. When the relay 510 is energized, this code-sending operation is initiated. The operation in the event that more than two circuit breakers are operated in quick succession will be obvious from the above description.

It will be apparent that the above provision by which the dispatcher is apprised of the exact order or consecution in which the circuit breakers operate is a distinct advantage, as it enables him to more quickly diagnose any trouble that may occur in the system.

A modification of our system is shown in Fig. 9. The manner in which this modification functions will now be described. In order to describe this operation, it will be assumed that the circuit breaker C—1 is closed by automatic devices (not shown). By the closure of the circuit breaker, a circuit is completed extending from ground by way of pallet switch 923, and winding of the line relay 900 of switch LS to battery. The line relay 900 is operated to complete a circuit extending from ground by way of armature 962 and its front contact, resting contact of spring 904 and said spring, winding of pull-down coil 906 and armature 982 and its back contact to battery. Another circuit is completed by the operation of armature 962 that extends through the winding 907 to battery.

The energization of the windings 906 and 907 causes the operation of the armatures 908 and 909 of the line switch LS. The armature 909, upon being operated, operates the plunger arm of the line switch, whereby the springs 915, 916, 917 and 924 are forced into engagement with their working contacts. The operation of the armature 908 operates the spring 904, thereby opening the circuit of the pull-down winding 906. However, the armatures 908 and 909 are maintained in operated position as the winding 907 remains energized.

Assuming that the code-sending apparatus is not functioning at the present time and that the circuit breaker C—1 is the first to operate, the wipers of the consecution control switch CCS—1 will be in the position shown. The relay 920 will be energized over a circuit extending from ground by way of wiper 990, bank contact 994, resistor 922, and relay 920 to battery. The wipers 990 to 993, inclusive, of the consecution control switch CCS—1 are operated into this position by the termination of the previous code-sending operation, the relay 1003 being energized to complete a circuit for the switching relay 1002 and a test circuit for the motor magnet 1004 at armatures 1009 and 1008, respectively. When the wipers are operated one step, the short-circuit will be removed from the switching relay 1002 and this relay will be operated to open the circuit of the line relay 1003. The line relay 1003 is deenergized to open the circuit of the relay 1002, which is also deenergized. The relay 920 is operated to prepare certain circuits at armatures 918 and 919. Now, when the springs 915, 916, 917 and 924 are operated into engagement with their working contacts, ground is placed upon the conductor 1062, whereby the code-sending operation is initiated. At the same time, certain code points are prepared at spring 915 and its working contact.

When ground is placed upon the conductor 1062, the code-sending operation is initiated in the same manner as before described and a code will be sent out corresponding to the position of the apparatus unit in the usual manner. When the code-sending operation is terminated, an armature, such as 1050, on a relay similar to the relay 602 of the finder switch F—1 will be operated to connect battery to the wiper 911. The connection of battery to the wiper 911 places battery upon the conductor 1051 and the relay 920 is short-circuited. Upon retracting its armatures, the relay 920 removes ground from the conductor 1062, thereby stopping the code-sending operation, an at armature 921 and its back contact, completes circuit extending from ground by way of said armature and its back contact, working contact of spring 917 and said spring, bank contact 997, wiper 993, armature 1007 and its back contact and winding of line relay 1003 of the consecution control switch CCS—1 to battery.

The line relay 1003 is operated to complete a circuit for the switching relay and the motor magnet and, at armature 1008, to connect test wiper 992 to a point midway between said switching relay and motor magnet. As there is ground present upon the bank contact 996, the switching relay 1002 will be short-circuited and the motor magnet 1004 will be operated to advance the switch wipers one step. The short-circuit will be removed from the relay 1002 and this relay is then energized. The relay 1003 is deenergized by the operation of the relay 1002, which is also deenergized.

When the line switch LS operated, ground was placed upon the bank contact 988 of the master switch MS by the operation of the spring 924. The placing of ground upon bank contact 988 causes the energization of the starting relay 966. The starting relay 966 operates to complete a circuit extending from ground through a locking magnet 962 to battery. The locking magnet 962 is energized to complete a circuit for the open main relay 963 and also operates the armature 976, thereby permitting the master switch to operate one step under the influence of its spring. The circuit of the starting relay 966 is thus opened and the locking magnet 962 is deenergized.

The open main relay 963 operates to disconnect battery from the battery-supply conductor to the pull-down windings of all the line switches so that none of these may be operated during the movement of the master switch. When the starting relay 966 is deenergized, the circuit of the magnet 962 is opened and the open main relay 963 is deenergized to again apply battery to the battery supply conductor.

The master switch, in operating, carries the plunger arms of all idle line switches opposite the next set of contacts that are similar to 915, 916, 917 and 924. The master switch moves from right to left under the influence of a spring (not shown). When the master switch is moved over to its furthermost left position, that is, into engagement with the tenth trunk, as the ordinary construction of these master switches is such that the line switches under their control have access to ten trunks or contacts, such as 915, 916, 917 and 924, and this trunk becomes busy by the operation of the line switch, the starting relay 966 is energized. When the master switch is in its furthermost left position, the spring 971 is in engagement with its working contact by reason of the operation of the operating member 968 operated by the solenoid magnet 961.

Now, when the starting relay 966 is operated, a circuit is completed for the relay 960 which operates its armature 972 to thereby force the spring 973 into engagement with its working contacts 974 and 975. By the engagement of the spring 973 with the spring 974, a circuit is completed for the solenoid magnet 961; while, by the operation of the spring 973 into engagement with the contact 975, a locking circuit is completed for the magnet 960. The spring 973 is locked in operated position by the locking member 970. The solenoid magnet 961 now operates to operate the master switch guide shaft, carrying the plunger arms of all the idle line switches, opposite the first trunk or in its furthermost right position. The operating member 967 operated by the solenoid 970 then withdraws the locking member 970 and permits the spring 973 to disengage the contacts 974 and 975. The master switch then moves one step at a time under the influence of the starting relay 966 and the magnet 962. The spring of the master switch furnishes the necessary mechanical power.

When the circuit breaker C—1 is opened, the line relay 900 of the line switch LS is deenergized, as is the winding 907 of the line switch. The armatures 909 and 908 are now released and the springs 915, 916, 917 and 924 are caused to disengage their working contacts. The restoration of the line switch brings it immediately under the control of the master switch guide shaft by reason of the well-known self-alining feature so that, should this line switch be again operated, it will be plunged into the next idle trunk.

The tripping of the circuit breaker C—1 causes the energization of the line relay 925. The line relay 925 operates to cause the operation of the armatures 931 and 932 of the line switch LS—1 and the consequent operation of the springs 933 to 936, inclusive. By the operation of the spring 935, ground is placed upon the bank contact in the master switch and the master switch is caused to take another step. The relay 940 having been previously energized by the operation of the switch CCS—1, ground is placed upon the starting conductor 1062 by the spring 934 engaging its working contact. The code-sending operation now takes place in the same manner as before described. Upon its termination, the relay 940 is deenergized and the consecution control switch CCS—1 is caused to take another step.

It will be seen that, if a number of circuit breakers or other apparatus units are operated in quick succession, the code-sending operations will occur so that indications are sent back to the dispatcher's office showing the position of these circuit breakers in the same sequence as the interrupters are operated.

Our invention is not limited to the particular arrangement of the apparatus described, but may be variously modified without departing from the spirit and scope of the invention, as set forth in the appended claims.

We claim as our invention:

1. In an electrical control system, the combination with a dispatcher's office, a station, a signalling line connecting said station and office and apparatus units in said station, of means for operating said units, signalling devices at said dispatcher's office selectively controlled over said line by the operation of said units, and means for invariably operating said signalling devices in the order in which any number of said units operate irrespective of the time intervening between the operation of said units.

2. In an electrical control system, the combination with a dispatcher's office, a station, a line connecting said station and office, apparatus units more than two in number in said station and signalling devices at said office, of means for operating said units, selector means including said line for operating said signalling devices in accordance with the operation of said units, and control means for invariably controlling said selector means to operate said signalling devices in the order in which said units operate irrespective of the time intervening between the operation of said units.

3. In an electrical control system, the combination with a station and apparatus units in said station, means for operating a plurality of the apparatus units, said units also being operable from said office, of code-sending means operative upon the operation of one of said units for sending a code of impulses, and a storing means for subsequently controlling the operation of said code-sending means to send the codes of impulses in accordance with the order of operation of other units of said plurality.

4. In an electrical control system, the combination with a station and three or more apparatus units in said station, automatic means for operating a plurality of apparatus units, said units being also operable from said office, of code-sending means operative upon the operation of one of said units for sending a code of impulses, and storing means for controlling the operation of said code-sending means so that codes of impulses are invariably sent out in accordance with the sequence in which said units operate irrespective of the time intervening between the operation of said units.

5. In an electrical control system, the combination with a dispatcher's office, a station, apparatus units in said station and signalling devices at said office, means for operating a plurality of apparatus units, of code-sending means for sending a code of impulses in accordance with the operation of one of said units to operate said signalling devices individual thereto, and storing means for subsequently controlling the operation of said code-sending means to send the codes of impulses in accordance with the sequence of operation of other units of said plurality.

6. In an electrical control system, the combination with a station, and apparatus units numbering more than two in said station, of means for operating said units in any sequence, code-sending means operative in response to the operation of said units for sending a code of impulses corresponding to the unit, an automatic switch operative responsive each time one of said units operates for controlling the operation of said code-sending device and means including circuit connections from said switch to said units so arranged that codes corresponding to the operation of the operated units are sent out in the same sequence as the units operate irrespective of the time intervening between the operation of said units.

7. In a supervisory control system, a first station, a second station, automatically operable apparatus units numbering more than two at said second station, a code transmitter common to all of said apparatus units for transmitting code combinations of impulses individual to said apparatus units and their operations, and means whereby said apparatus units seize said code transmitter for transmitting said code combinations of impulses in the order in which said apparatus units operate irrespective of the time intervening between the operation of said units.

8. In a supervisory control system, a first station, a second station, automatically operable apparatus units at said second station numbering more than two, a common code transmitter for transmitting code combinations of impulses individual to said apparatus units and their operation to said first station, and means whereby said code transmitter transmits the codes in the order in which said apparatus units operate irrespective of the time intervening between the operation of said units.

In testimony whereof, we have hereunto subscribed our names this 16th day of April, 1924.

THOMAS U. WHITE.
JOHN E. GARDNER.